United States Patent [19]

Takeuchi

[11] Patent Number: 4,638,467

[45] Date of Patent: Jan. 20, 1987

[54] AZIMUTH ADAPTIVE PHASED ARRAY SONAR

[75] Inventor: Yasuhito Takeuchi, Tokyo, Japan

[73] Assignee: Yokogawa Medical Systems, Limited, Tokyo, Japan

[21] Appl. No.: 617,083

[22] Filed: Jun. 4, 1984

[30] Foreign Application Priority Data

Aug. 31, 1983 [JP] Japan ............................... 58-160105

[51] Int. Cl.$^4$ ............................................ G01N 29/00
[52] U.S. Cl. ...................................... 367/105; 73/626; 128/660
[58] Field of Search ................. 367/103, 105, 905, 12, 367/61, 122; 73/625, 626; 128/661, 660

[56] References Cited

U.S. PATENT DOCUMENTS

| | | | |
|---|---|---|---|
| 4,079,352 | 3/1978 | Burckhardt et al. | 367/905 |
| 4,241,610 | 12/1980 | Anderson | 367/105 |
| 4,455,630 | 6/1984 | Loonen | 367/103 |
| 4,528,854 | 7/1985 | Shimazaki | 367/105 |

Primary Examiner—Thomas H. Tarcza
Assistant Examiner—Daniel T. Pihulic
Attorney, Agent, or Firm—Moonray Kojima

[57] ABSTRACT

A phased array sonar is arranged to obtain an image in a wide field of view beyond a normal angle of view. In an angle of view beyond the normal angle of view, the number of active transducer elements, which are simultaneously energized, is reduced, as the angle of view is increased, and at the same time, the amplification factor for the echo signals is increased.

2 Claims, 5 Drawing Figures

AZIMUTH ADAPTIVE PHASED ARRAY SONAR

BACKGROUND OF THE INVENTION

1. Field of Invention

This invention relates to azimuth adaptive phased array sonars, such as used in an ultrasonic display system, and more particularly, to such azimuth adaptive phased array sonars which are adapted for medical use and which are capable of obtaining wider images through an increased angle of view.

2. Description of Prior Art

In order to increase the angle of view of a phased array sonar, it is necessary to provide a delay line which is capable of coping with delay mapping which is necessary to increase the angle of view. However, providing such a delay line to increase the width of the image, requires the use of an additional piece of hardware to a conventional circuit for obtaining a conventional image with a conventional angle of view.

SUMMARY OF THE INVENTION

Accordingly, an object of the invention is to overcome the aforementioned and other deficiencies and disadvantages of the prior art.

Another object is to provide an azimuth adaptive phased array sonar which is capable of obtaining images having increased angles of view through software processing, such as setting changes, and without substantially changing the hardware used to obtain images with usual angles of view.

The foregoing and other objects are attained by the invention which encompasses an azimuth adaptive phased array sonar for obtaining images in wide angles of view, comprising a probe comprising an array of transducer elements; a transmission and reception device for scanning in a sectorial pattern an ultrasonic beam transmitted and received by driving the probe in a phased array method; a trigger generator; a control circuit; and a signal processor. The transmission and reception device comprises a receiver (or transmission) circuit comprising a cross point switch for receiving output signals from the transducer elements of the probe (or transmitting to) with the cross point switch having a plurality of output terminals; a tapped delay line for receiving (or transmitting) as tap inputs, signals from the output terminals of the crosspoint switch, and an amplifier circuit for receiving (or transmitting) output signals from the delay line. The control circuit controls the opening and closing of the crosspoint switch, and is arranged to reject signals from transducer elements which are located at the ends of the probe and to control the angle of the scanning ultrasonic beam, thereby to extend in an angle range greater than the limit angle, in which all of the transducer elements of the probe are assigned to the entire length of the delay line. The amplifier circuit may be controlled to increase the gain thereof as the number of active transducer elements is reduced, with the increase in angle of view.

DETAILED DESCRIPTION OF PREFERRED EMBODIMENTS

Figure 1:
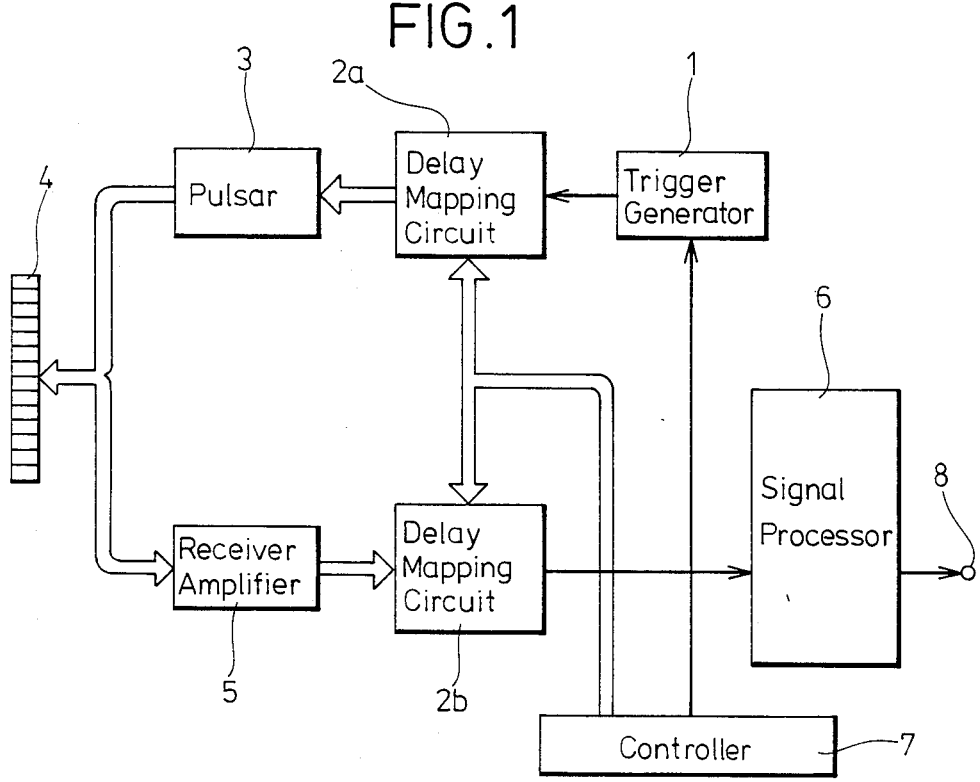
FIG. 1 is a block diagram depicting an illustrative embodiment of the invention.

FIG. 1 depicts an illustrative azimuth adaptive phased array sonar comprising a trigger generator 1 having an output terminal connected to a transmission delay mapping circuit 2a which has its output terminal coupled to a pulsar 3. Pulsar 3 has an output terminal connected to a plurality of transducers 4 of a probe. The transducers 4 are connected to an input terminal of a receiver amplifier 5 which has its output terminal coupled to an input terminal of a reception delay mapping circuit 2b. Reception delay mapping circuit 2b has an output terminal connected to an input terminal of a signal processor 6 which has an output terminal 8. Trigger generator 1 and delay mapping circuits 2a,2b are controlled by a control circuit or controller 7.

In FIG. 1, a trigger signal generated by trigger generator 1, at a timing relationship controlled by controller 7, is fed to reception delay mapping circuit 2a. Delay mapping circuit 2a has as many delay lines as there are transducers 4 of the probe. The delays caused by the respective delay lines are controlled by controller 7 at a delay time distribution such that the steering angle of a beam will be at a prescribed angle when taking into account beam focusing and other factors. The delayed outputs from delay mapping circuit 2a are supplied to pulsar 3. Pulsar 3 is directly coupled individually to each of transducers 4 which are energized at the same time. Pulsar 3 is energized by the outputs from respective delay lines corresponding to the respective elements of pulsar 3 to thereby produce drive pulses to energize transducers 4, which then emit an ultrasonic beam at a prescribed azimuth or bearing.

Thereafter, echo signals returning from exposure to an object being examined, are received by the elements of transducers 4 and are converted into electric signals which are then amplified at predetermined amplification factors by receiver amplifier 5. The amplified echo signals are corrected so as to be synchronous by reception delay mapping circuit 2b and having the same delay time distribution as that of transmission delay mapping circuit 2a. Then, the echo signals are combined into one signal and supplied to signal processor 6 which suitably processes the signal. The processed signal is the supplied to a video signal output terminal 8.

From the standpoint of delay mapping imposed on the transducer elements 4 of the transducer array, the transmission and reception delay mapping circuits 2a and 2b are the same as each other. Thus, only one of the circuits, such as reception delay mapping circuit 2b will be described hereat for sake of simplicity of description. It is to be understood that the same principles of operation are applicable to the other circuit 2a.

Figure 2:
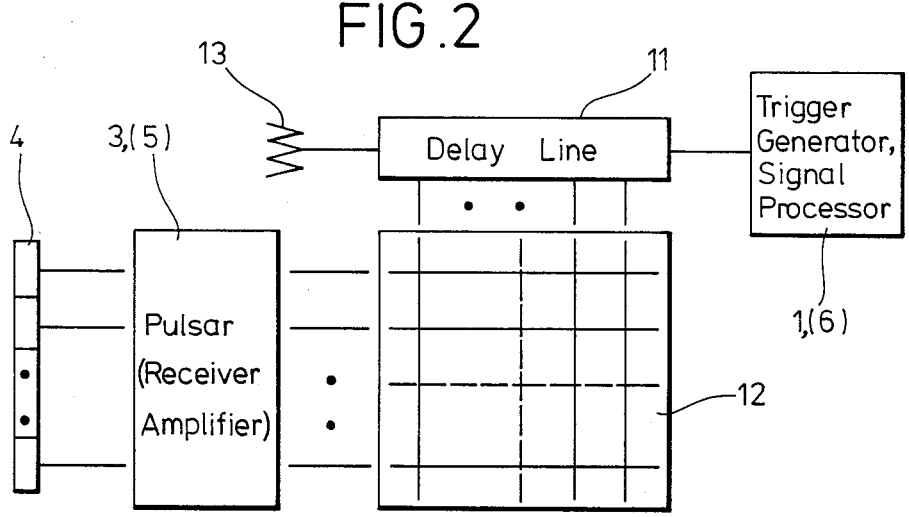
FIG. 2 is a block diagram depicting a delay mapping circuit of the embodiment of FIG. 1.

FIG. 2 shows in block diagram form a delay mapping circuit (such as 2a or 2b) comprising a tapped delay line 11, a terminal impedance 13, and a cross point switch 12. Crosspoint switch 12 has line terminals connected through pulsars 3 (or receiver amplifier 5) to arrayed transducers 4 and column terminals connected to the taps of tapped delay line 11. The setting of connections of the intersections of the lines and columns of crosspoint switch 12, or delay mapping, is effected by a command from controller 7.

Figure 3:
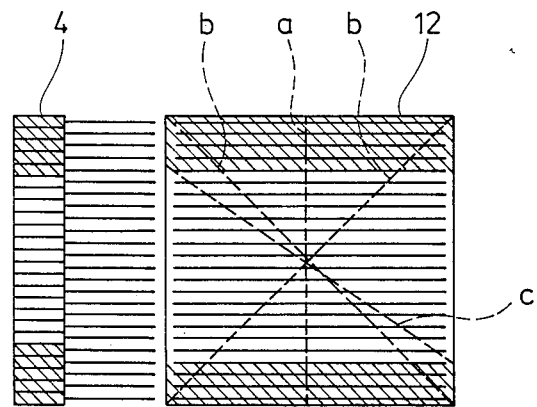
FIG. 3 is a diagram depicting the relationship between the crosspoint switch and the array of transducers.

FIG. 3 schematically shows the manner in which arrayed transducers 4 and crosspoint switch 12 are connected. The elements of arrayed transducers 4 are connected respectively to the lines of crosspoint switch 12.

Broken lines a, b, c indicate summing up lines set by action of controller 7. Broken line a indicates a steering angle 0°. Broker line b indicates a limit condition wherein all of the columns of the crosspoint switch 12 and all of the arrayed transducers 4, are used, whereupon the steering angle is $\theta$ max.

The summing up line c indicates that a beam is received by and is transmitted from arrayed transducers 4 at a steering angle greater than the steering angle $\theta$max. When such a beam is received and transmitted, those transducers 4 which are positioned in regions indicated by the cross hatching lines are not used. The number of transducer elements 4 which are active, is reduced as the steering angle $\theta$ is increased. This results in slightly reduced image quality and resolution. However, advantageously, the image of the object in such a range enjoys a wider field of view than otherwise conventionally possible. Advantageously, the central image is still of good quality and resolution, at least as good as for conventional images with the range of $\theta$max. The added image width, although of slightly reduce quality and resolution, is for practical purposes highly desirable since in many cases the surrounding environment is desirous of being examined at the same time the central object image is being examined, although the added image is desired to be examined to a degree not as great as that of the central image.

Figure 5:
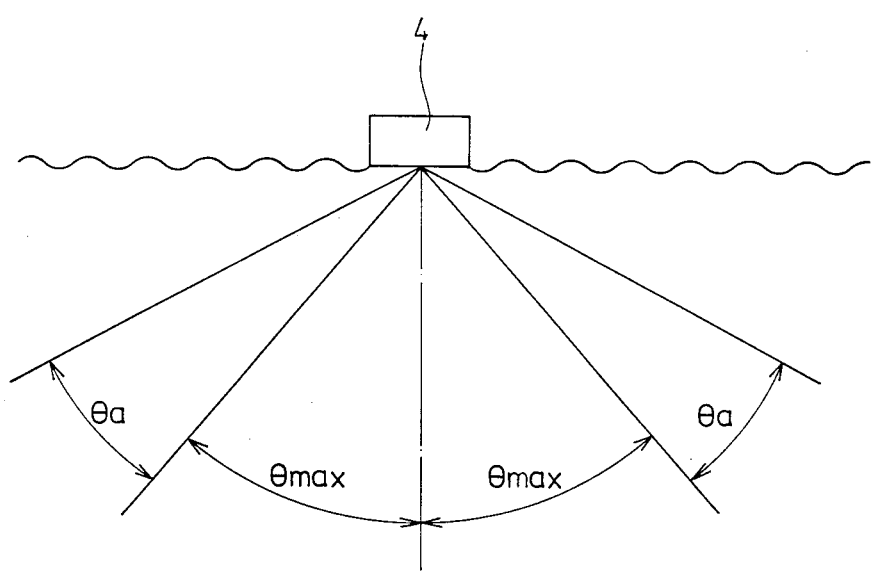
FIG. 5 is a diagram depicting the ranges of the field of view.

With the present invention, controller 7 can be set for steering the beam in the range of a steering angle greater than the steering angle $\theta$max, such as shown in FIG. 5.

Furthermore, in the event the quality of the image in the range of the steering angle beyond or greater than the steering angle $\theta$max, is desired to be improved, the amplification of the receiver amplifier 5 may preferably be controlled so as to be increased as the number of active transducers 4 being energized is reduced.

Figure 4:
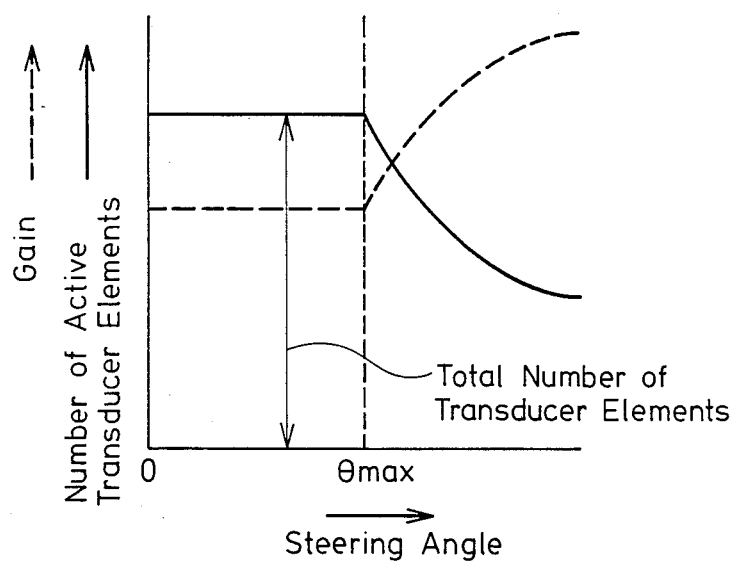
FIG. 4 is a graph depicting the relationship between the steering angle, the gain of a receiver amplifier, and the number of active transducer elements.

As shown in FIG. 4, the number of active transducer elements 4 in a steering angle range up to the steering angle $\theta$max is equal to the total number of transducer elements available, and the gain of the receiver amplifier remains constant within such a steering angle range. As the beam is steered through an angle beyond or greater than the steering angle $\theta$max, the number active transducer elements starts to be reduced, and the gain of the receiver amplifier may be increased to compensate for reduction in the sensitivity of the overall system which is caused by such a reduction in the number of active transducer elements.

With such an arrangement, the field of view during full performance of the sonar system using the entire transducer elements of the probe is up to the steering angle $\theta$max, as shown in FIG. 5. When it is desired to obtain an enlarged image beyond the angle $\theta$max, the number of active transducer elements 4 is reduced by using a delay map having a size given by the reduced number of active transducer elements. This will sacrifice somewhat the quality or sharpness of the image produced. At the same time, however, an image is produced which has a wider additional range of angles $\theta$a (such as shown in FIG. 5).

Advantageously, the invention can provide wider images by use of control software and without substantially changing the hardware over that required to produce the usual angle of view. Thus, an image at an increased angle of view, can be readily produced by simple modification of the system used for attaining images with the usual angle of view. Where the invention is applied to a medical apparatus, it is highly advantageous in achieving a wide field of view even with reduced image quality while visually confirming an object within a desired range. For example, the invention is useful in such an apparatus which requires monitoring the surroundings of a localized portion of a human body which is being viewed in a small angle of view.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An azimuth adaptive phased array sonar comprising
   a probe comprising an array of a plurality of transducer elements, said array having two ends;
   a transmission and reception device for scanning in a sectorial pattern an ultrasonic beam transmitted and received by said probe in a phased array manner, wherein said transmission and reception device comprises
      a receiver circuit comprising a delay line having a plurality of taps along the length thereof,
      an amplifier circuit for receiving an output signal from said delay line, and
      a cross point switch comprising a plurality of columns, a plurality of lines, and a plurality of switching elements arranged in a matrix at the intersections of said columns and said lines, said columns being connected to respective ones of said plurality of taps of said delay line, and said lines being connected to respective ones of said plurality of transducer elements; and
   control means for selectively opening and closing said plurality of switching elements of said cross point switch;
   wherein said control means comprises means for directing said ultrasonic beam beyond the limit of azimuth angle of said ultrasonic beam such that signals generated from transducer elements remaining operative after an equal number of transducer elements from each end of said array are rendered inoperative, are switched through selected ones of said switching elements of said cross point switch and supplied over the entire length of said delay line.

2. The sonar of claim 1, wherein said amplifier circuit is controlled by said control circuit to increase gain thereof as the number of active transducer elements is decreased.

* * * * *